United States Patent
Melvin et al.

[11] Patent Number: 5,944,806
[45] Date of Patent: Aug. 31, 1999

[54] MICROPROCESSOR WITH VERSATILE ADDRESSING

[75] Inventors: Bruce W. Melvin; Bharat Singh, both of Roseville, Calif.

[73] Assignee: Hewlett-Packard Company, Palo Alto, Calif.

[21] Appl. No.: 08/938,866

[22] Filed: Sep. 26, 1997

[51] Int. Cl.⁶ .................... G06F 13/38; G06F 13/40
[52] U.S. Cl. .................. 710/126; 710/129; 712/38
[58] Field of Search .................. 395/306, 310, 395/309, 800.38, 800.33; 710/130, 126, 129, 38, 33

[56] References Cited

U.S. PATENT DOCUMENTS

| | | | |
|---|---|---|---|
| 5,262,991 | 11/1993 | Pope | 365/189.02 |
| 5,359,717 | 10/1994 | Bowles et al. | 395/309 |
| 5,483,660 | 1/1996 | Yishay et al. | 395/280 |
| 5,530,812 | 6/1996 | Kim et al. | 395/309 |
| 5,557,757 | 9/1996 | Gephardt et al. | 395/306 |
| 5,636,370 | 6/1997 | Sicsic | 395/800 |
| 5,652,847 | 7/1997 | Padwekar | 395/306 |
| 5,694,557 | 12/1997 | Yang | 395/309 |
| 5,768,550 | 6/1998 | Dean et al. | 395/309 |
| 5,781,746 | 7/1998 | Fleek | 395/306 |
| 5,793,990 | 8/1998 | Jirgal et al. | 395/287 |
| 5,805,843 | 9/1998 | Gehlhaar | 395/309 |

*Primary Examiner*—Larry D. Donaghue

[57] ABSTRACT

A processor performs data transactions. For a first data transfer between the processor and a first external device which uses non-multiplexed data transactions, a first address is placed on an (external) address bus and first data is transferred on an (external) address/data bus. A second data transaction is performed between the processor and a second external device which uses multiplexed data transactions. In an address phase of the second data transaction, a second address is placed on the address/data bus. In a data phase of the second transaction, second data is transferred on the address/data bus.

12 Claims, 5 Drawing Sheets

| MAP VALUE | CPU STATE | | CONTROL SIGNALS | |
| --- | --- | --- | --- | --- |
| MULTIPLEXED = 1<br>NON-MULTIPLEXED = 0 | ADDRESS PHASE = 1<br>DATA PHASE = 0 | READ = 1<br>WRITE = 0 | MULTIPLEX<br>CONTROL | BUFFER<br>CONTROL |
| 0 | X | 0 | 0 | 0 |
| 0 | X | 1 | X | 1 |
| 1 | 0 | 0 | 0 | 0 |
| 1 | 0 | 1 | X | 1 |
| 1 | 1 | X | 1 | 0 |

FIGURE 4

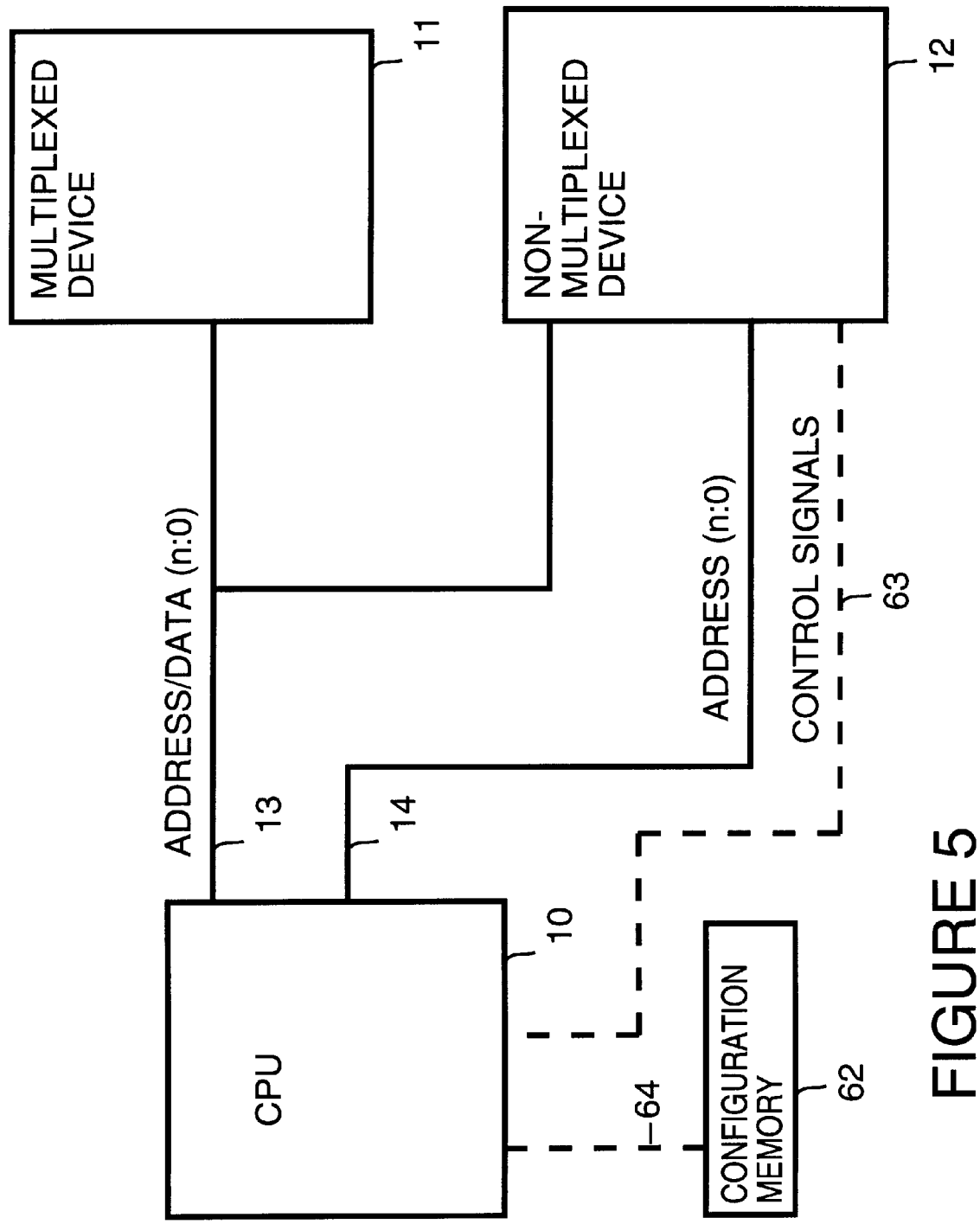

MICROPROCESSOR WITH VERSATILE ADDRESSING

BACKGROUND

The present invention concerns transfer of data over a microprocessor bus and pertains particularly to a microprocessor which is able to use both multiplexed addressing and non-multiplexed addressing.

Central processing units (CPUs) and microprocessor generally have four types of input and output signals: address signals, data signals, control and status signals and power signals. The address signals are generally placed on an address bus. The address signals are output signals used to indicate the target of a data access. The access is generally a read of data from a data storage device or a write of data to a data storage device.

The data signals are generally transferred over a data bus. Data signals are bidirectional signals used to transfer instruction and data to and from the CPU or microprocessor.

The control and status signals include, for example, bus transfer control signals, interrupt signals, control signals, test signals, emulation control signals, status signals, clocking signals, and so on. The particular combination of control and status signals used by a CPU or microprocessor is specific to the individual CPU or microprocessor.

The power signals generally include one or more power signals and a reference (or return) signal.

For example, the 680xx family of microprocessor, available from Motorola Communications and Electronics Inc., having a business address at 801 Ames Avenue, Milpitas, Calif., uses separate address and data buses (Non-multiplexed) on its 680xx processors and "Coldfire" processors. Motorola's 680xx family of processors allows the data bus width to dynamically change on a transfer by transfer basis based on control signals exchanged during the transfer.

In order to reduce complexity and manufacturing cost of integrated circuits and the packaging of integrated circuits, as well as to reduce the complexity of board level trace routing, it is desirable to reduce the number of pins used by a packaged microprocessor. For this reason it is common to find microprocessors which provide multiplexed address and data bus signals.

Multiplexing address signals and data bus signals is accomplished by utilizing a single set of input/output (I/O) pins for the microprocessor and by time multiplexing the address and data on this single set of I/O pins. These I/O pins together may be referred to as a multiplexed address and data bus. Using such a multiplexed address and data bus, the address is generally transferred over the multiplexed address and data bus during the first phase of an access cycle and then the data is transferred over the multiplexed address and data bus during the remaining phases of the transfer.

While this approach can reduce the CPU cost, it can increase the system cost when the CPU is interfaced with devices which do not support multiplexed address and data buses. In such cases, additional circuitry is required to extract the address during the address phase of the transfer. Likewise, when a system employs a CPU with non-multiplexed address and data buses, system cost may increase when the CPU is interfaced with devices with multiplexed buses.

For example, Intel i960 central processing units available from Intel Corporation, having a business address of 2200 Mission College Boulevard, Santa Clara, Calif. 95050, use multiplexed address and data. Intel i960 processors divide the addressable memory space into fixed sized regions. Each region has a corresponding dedicated configuration register which contains region specific information as to the bus width of target devices and the number of cycles required to complete a transfer. This information is used dynamically for each transfer throughout the addressable memory and I/O space. The configuration information is initially programmed when the device is powered by reading from a specific memory region in a required memory device.

SUMMARY OF THE INVENTION

In accordance with the preferred embodiment of the present invention, a processor performs data transactions. For a first data transfer between the processor and a first external device which uses non-multiplexed data transactions, a first address is placed on an (external) address bus and first data is transferred on an (external) address/data bus. A second data transaction is performed between the processor and a second external device which uses multiplexed data transactions. In an address phase of the second data transaction, a second address is placed on the address/data bus. In a data phase of the second transaction, second data is transferred on the address/data bus.

In the preferred embodiment of the present invention, the processor includes an internal address bus, an internal data bus, and a selector. The selector electrically connects the internal data bus to the external address/data bus during the first data transfer between the processor and the first external device. The selector electrically connects the internal address bus to the external address/data bus during the address phase of a second data transfer between the processor and the second external device. The selector electrically connects the internal data bus to the external address/data bus during the data phase of the second data transfer between the processor and the second external device.

For example, a bus controller is connected to the internal address bus, the internal data bus, and the selector. The bus controller includes an address region configuration map which indicates which memory regions are located within an external device which uses non-multiplexed data transactions, and which memory regions are located within an external device which uses multiplexed data transactions.

For example, the selector includes a multiplexer. The multiplexer has a first selection input connected to the internal data bus and has a second selection input connected to the internal address bus. The selector also includes an output buffer. An input of the output buffer is connected to an output of the multiplexer. An output of the output buffer is connected to the external address/data bus. The selector additionally includes an input buffer. An input of the input buffer is connected to the external address/data bus and an output of the input buffer is connected to the internal data bus.

In the preferred embodiment, the multiplexer has a multiplexer control input, the output buffer has an output buffer control input, and the input buffer has an input buffer control input. In one embodiment, either the output buffer control input or the input buffer control input is inverted and the input buffer control input is connected to the output buffer control input. The bus controller places control signals on the multiplexer control input, on the output buffer control input and on the input buffer control input.

For example, when the first data transaction is a write transaction, a first multiplexer value is placed on multiplexer control input and a first buffer control value is placed on the output buffer control input and on the input buffer control input. When the first data transaction is a read transaction, a second buffer control value is placed on the output buffer control input and on the input buffer control input.

When the second data transaction is a write transaction, the first multiplexer value is placed on multiplexer control input and the first buffer control value is placed on the output buffer control input and on the input buffer control input during the data phase of the second data transaction. When the second data transaction is a read transaction, the second buffer control value is placed on the output buffer control input and on the input buffer control input during the data phase of the second data transaction. During the address phase of the second data transaction, a second multiplexer value is placed on multiplexer control input and the first buffer control value is placed on the output buffer control input and on the input buffer control input.

The present invention allows a processor to use a bus as both a multiplexed bus and a non-multiplexed bus. This allows for great flexibility in connecting external devices which are either multiplexed or non-multiplexed.

BRIEF DESCRIPTION OF THE DRAWING

FIG. 4 shows a simplified truth table which shows control signals generated by a bus controller within the processor shown in FIG. 1 in accordance with the preferred embodiment of the present invention.

FIG. 5 is simplified block diagram which illustrates ways a processor can access a configuration memory in accordance with the preferred embodiments of the present invention.

DESCRIPTION OF THE PREFERRED EMBODIMENT

Figure 1:
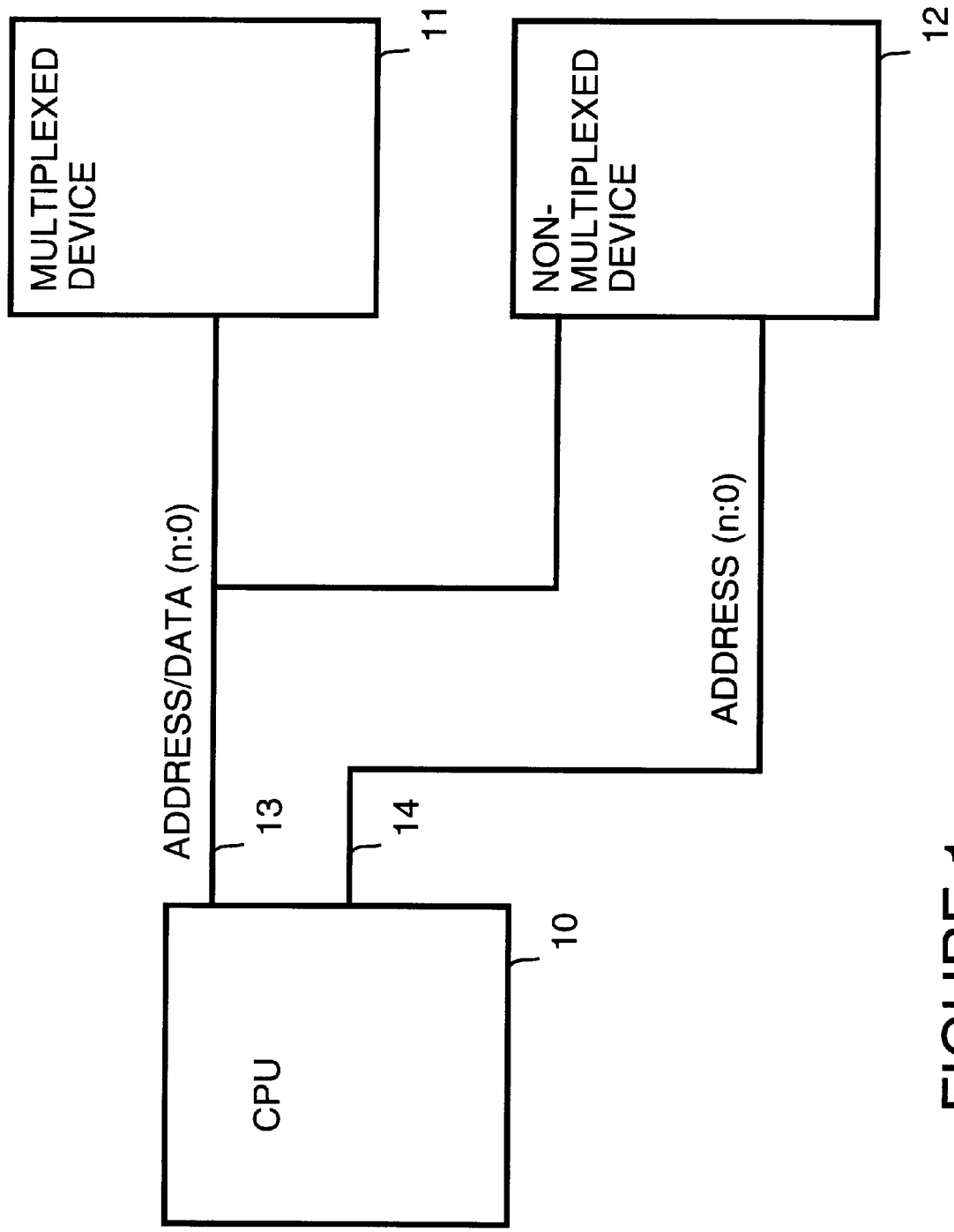
FIG. 1 is a simplified block diagram which shows a processor bus connecting a processor both to a device which utilizes multiplexed addressing and a device which does not utilize multiplexed addressing in accordance with the preferred embodiment of the present invention.

FIG. 1 is a simplified block diagram showing a central processing unit (CPU) 10 connected to a processor bus. The processor bus includes an address bus 14 and a multiplexed address/data bus 13. When communicating with a multiplexed device 11, CPU 10 time multiplexes address signals and data signals on multiplexed address/data bus 13. When communicating with a non-multiplexed device 12, CPU 10 places address signals on address lines 14 and transfers data signals on multiplexed address/data bus 13. When communicating with non-multiplexed device 12, multiplexed address/data bus 13 is used only for data signals and address signals are not multiplexed onto address/data bus 13.

Figure 2:
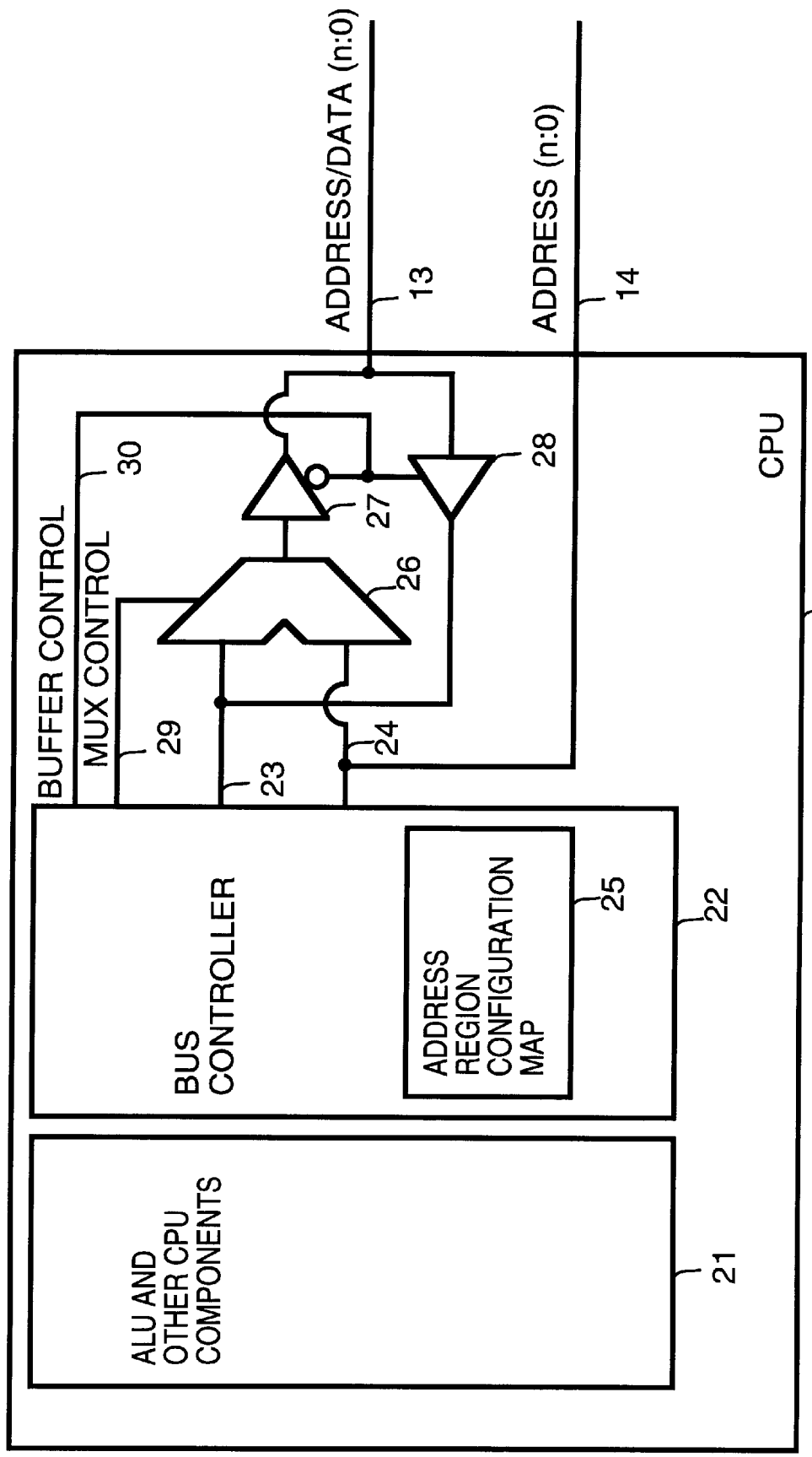
FIG. 2 is simplified block diagram of the processor shown in FIG. 1 in accordance with the preferred embodiment of the present invention.

FIG. 2 is a simplified block diagram of CPU 10. CPU 10 includes a bus controller 22. Bus controller 22 includes an address region configuration map 25, which is described more fully below. CPU 10 also includes ALU and other CPU components as represented by a block 21.

Bus controller 22 has an internal data bus 23 and an internal address bus 24. A multiplexer 26 selects, as output, signals on either internal data bus 23 or internal address bus 24. Multiplexer 26 is controlled by a multiplex control signal on a multiplexer control line 29.

For data writes from CPU 10 to another device, a tri-state gate (output buffer) 27 is turned on connecting the output of multiplexer 26 to multiplexed address/data bus 13. For data reads to CPU 10 from another device, a tri-state gate (input buffer) 28 is turned on connecting the multiplexed address/data bus 13 to internal data bus 23. Tri-state gate 27 and tri-state gate 28 are controlled by a buffer control signal on buffer control line 30 driven by bus controller 22.

FIG. 2 demonstrates the internal selection necessary to provide CPU 10 with both multiplexed and non-multiplexed address and data buses. The multiplex control signal on multiplexer control line 29 determines whether the internal address bus 24 or internal data bus 23 will be routed to tri-state gate 27, which serves as an address/data buffer. Tri-state gate 28 acts as an input buffer to gate address/data bus 13 during read, fetch or load transfers, onto internal data bus 23.

Address region configuration map 25 is used to implement address regions which can be programmed as either multiplexed or non-multiplexed. For example, the memory space of CPU 10 can be divided into a finite number of memory regions. Each memory region is accessed either by multiplexing address and data signals on multiplexed address/data bus 13 or by placing address signals on address bus 14 and placing data on multiplexed address/data bus 13.

Figure 3:
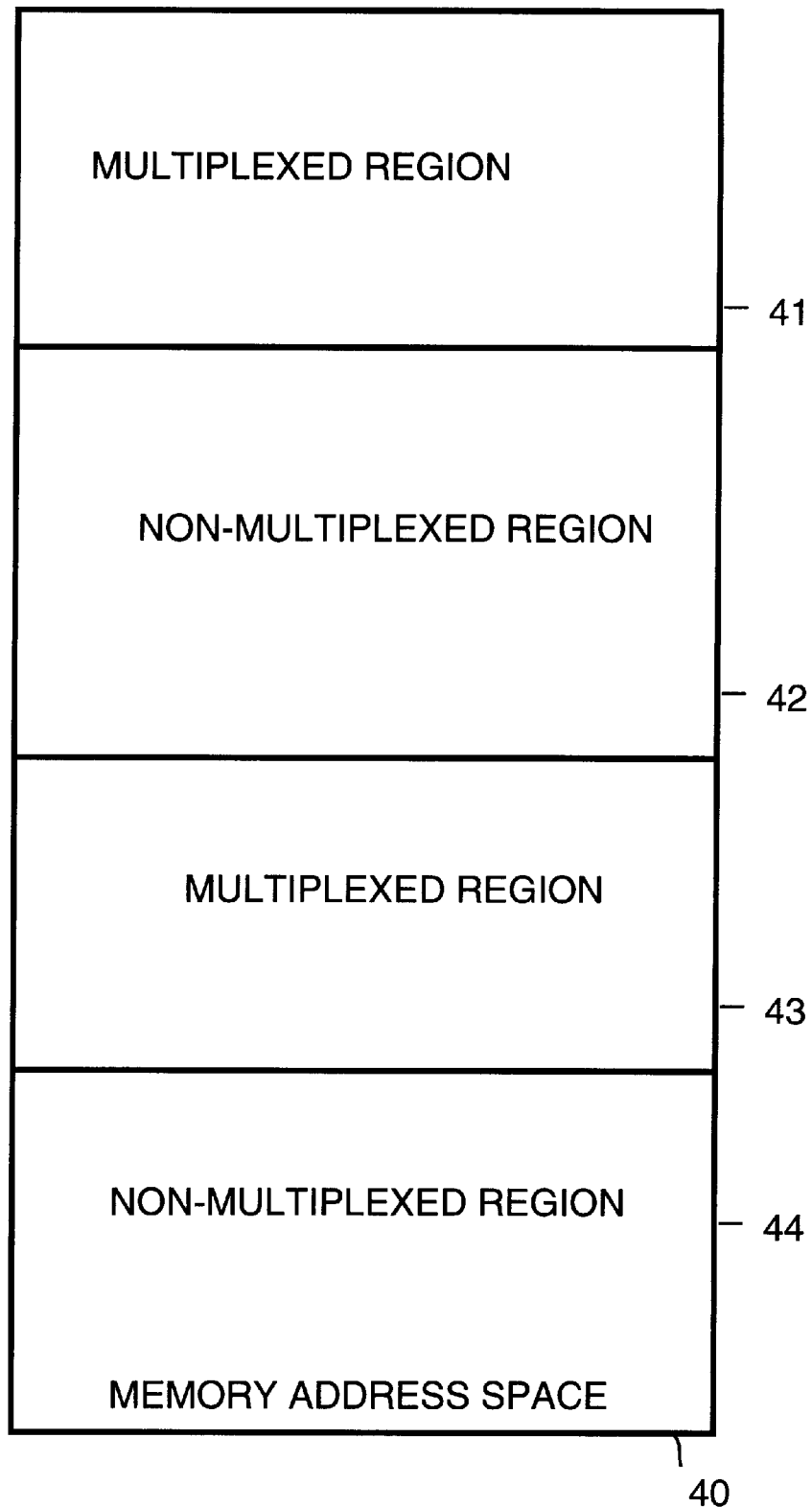
FIG. 3 is a map of a portion of the memory address space for the processor shown in FIG. 1 in accordance with the preferred embodiment of the present invention.

For example, FIG. 3 shows a portion of address memory space 40 for CPU 10. A multiplexed region 41 is accessed by multiplexing address and data signals on multiplexed address/data bus 13. A non-multiplexed region 42 is accessed by placing address signals on address bus 14 and transferring data on multiplexed address/data bus 13. A multiplexed region 43 is accessed by multiplexing address and data signals on multiplexed address/data bus 13. A non-multiplexed region 44 is accessed by placing address signals on address bus 14 and transferring data on multiplexed address/data bus 13.

In the preferred embodiment of the present invention, CPU 10 generates values for address region configuration map 25 by reading configuration information, about memory address space 40, stored in memory. The configuration information is used to set up address region configuration map 25 in order to identify the appropriate bus format for each memory region depending upon the type of devices which are associated with each memory region. For memory regions associated with multiplexed devices, the memory regions are configured in address region configuration map 25 as multiplexed regions. For memory regions associated with non-multiplexed devices, the memory regions are configured in address region configuration map 25 as non-multiplexed regions.

In an alternative embodiment of the present invention, a target device communicates bus type information to CPU 10 on a transfer by transfer basis using control signals exchanged between CPU 10 and the target device.

FIG. 4 shows a simplified truth table 50. Truth table 50 shows control signals generated by bus controller 22 within CPU 10.

A multiplexed/non-multiplexed variable in a column 51 is stored in address region configuration map 25. For each memory region this variable is set to a logic "1" if the memory region supports a multiplexed bus, and the variable is set to a logic "0" if the memory region supports a non-multiplexed bus. The memory regions are programmed just after power-up or reset by accessing an external configuration block stored in an external memory device.

As the bus is not configured for this initial access it is necessary to loosely specify the characteristics of the configuration memory device. For example, a configuration memory device is specified as non-multiplexed, n-bits wide and requiring m CPU cycles to transfer each n-bits.

Alternatively, the CPU has a separate simple serial interface which slowly transfers configuration information to the CPU on a bit by bit basis from an external serial memory device.

For example, FIG. 5 shows an embodiment of the present invention wherein configuration information is stored in a separate configuration device 62. At start-up or reset, CPU 10 can access configuration device 62 through a special serial bus 64. Alternatively, at start-up or reset, CPU 10 can access configuration device 62 through a connection (not shown) to address bus 14 and address/data bus 13.

FIG. 5 also shows a control signal bus 63 which can be implemented for embodiments of the present invention which transfer bus type information on a transfer-by-transfer basis.

An address/data phase variable in a column 52 of truth table 50 (shown in FIG. 4) is generated and used by bus controller 22 to determine the phase of the transfer as either the address phase or the data phase during a multiplexed transfer. Phase information is not used during a non-multiplexed transfer. The address/data phase variable is equal to 1 when, during a multiplexed transfer, the transfer is in the address phase. The address/data phase variable is equal to 0 when, during a multiplexed transfer, the transfer is in the data phase.

A read/write variable in a column 53 of truth table 50 is generated and used by bus controller 22 to control the direction of a data transfer. The read/write variable is equal to 1 when data is read from an external device and transferred to CPU 10. The read/write variable is equal to 0 when data is written from CPU 10 to an external device.

The multiplex control signal in column 54 is the multiplex control signal which bus controller 22 places on multiplexer control line 29. The buffer control signal in column 55 is the buffer control signal which bus controller 22 places on buffer control line 30.

As can be seen from truth table 50, when the multiplexed/non-multiplexed variable (column 51) is equal to 0 and the read/write variable (column 53) is equal to 0, the multiplex control signal (column 54) is equal to 0 and the buffer control signal (column 55) is equal to 0. When the multiplexed/non-multiplexed variable (column 51) is equal to 0 and the read/write variable (column 53) is equal to 1, the buffer control signal (column 55) is equal to 1.

When the multiplexed/non-multiplexed variable (column 51) is equal to 1, the address/data phase variable (column 52) is equal to 0 and the read/write variable (column 53) is equal to 0, the multiplex control signal (column 54) is equal to 0 and the buffer control signal (column 55) is equal to 0. When the multiplexed/non-multiplexed variable (column 51) is equal to 1, the address/data phase variable (column 52) is equal to 0 and the read/write variable (column 53) is equal to 1, the buffer control signal (column 55) is equal to 1. When the multiplexed/non-multiplexed variable (column 51) is equal to 1 and the address/data phase variable (column 52) is equal to 1, the multiplex control signal (column 54) is equal to 1 and the buffer control signal (column 55) is equal to 0.

A read transfer from non-multiplexed device 12 to CPU 10 is first initiated by accessing the configuration information (in address region configuration map 25) for the memory region within non-multiplexed device 12. This information is used to determine bus width, required access time, and bus type for accesses to non-multiplexed device 12. In this case, the configuration information indicates that the non-multiplexed device 12 has a non-multiplexed address/data bus. A non-multiplexed transfer is then initiated by CPU 10 by driving the target memory address or I/O location on to internal address bus 24. Internal address bus 24 is driven on to address bus 14 where the address is delivered to non-multiplexed device 12. At the same time input buffer 28 is enabled such that data on address/data bus 13 is buffered to internal data bus 23. Once the required access time indicated in the configuration register expires, or a target device acknowledgment (control signal) is received, the data is latched by bus controller 22 and the access ends.

A non-multiplexed write transfer from CPU 10 to non-multiplexed device 12 is first initiated by accessing the configuration information (in address region configuration map 25) for the memory region within non-multiplexed device 12. This information is used to determine the target devices bus width, required access time, and bus type. In this case, the configuration information indicates that non-multiplexed device 12 has a non-multiplexed address/data bus. A non-multiplexed transfer is then initiated by CPU 10 by driving the target address or I/O location within non-multiplexed device 12 on to internal address bus 24. Internal address bus 24 is driven on to address bus 14 where it is delivered to non-multiplexed device 12. At the same time output buffer 27 is enabled such that data on internal data bus 23 is buffered to address/data bus 13. Once the required access time indicated in the configuration register expires, or a target device acknowledgment (control signal) is received the access ends.

A multiplexed read transfer from multiplexed device 11 to CPU 10 is first initiated by accessing the configuration information (in address region configuration map 25) for the memory region which is stored by multiplexed device 11. This information is used to determine the bus width, required access time, and bus type used for access to multiplexed device 11. In this case, the configuration information indicates that multiplexed device 11 has a multiplexed address and data bus. A multiplexed transfer is then initiated by CPU 10 by driving the target memory or I/O location on to internal address bus 24. For the address phase of the multiplexed transfer, multiplexer 26 gates the internal address to the input of output buffer 27. This is indicated in the truth table shown in FIG. 4 (described above). Additionally, output buffer 27 is enabled thus driving internal address bus 24 onto address/data bus 13 where it is delivered to the multiplexed device 11. After the address has been delivered and the address phase transitions to the data phase, output buffer 27 is disabled and input buffer 28 is enabled, as indicated in the truth table shown in FIG. 4. The state of address/data bus 13 is then driven on to internal data bus 23. Single or multiple transfer can occur before the end of the access.

A multiplexed write transfer from CPU 10 to multiplexed device 11 is first initiated by accessing the configuration information (in address region configuration map 25) for the memory region which is stored by multiplexed device 11. This information is used to determine the bus width, required access time, and bus type for multiplexed device 11. In this case, the configuration information indicates that multiplexed device 11 has a multiplexed address and data bus. A multiplexed transfer is then initiated by CPU 10 by driving the target memory or I/O location on to internal address bus 24. During the address phase of the multiplexed transfer, multiplexer 26 gates the internal address to the input of output buffer 27. This is indicated in the truth table shown in FIG. 4. Additionally, output buffer 27 is enabled thus driving the state of internal address bus 24 onto address/data bus 13 where it is delivered to multiplexed device 11. After the address has been delivered and the address phase transitions to the data phase, output buffer 27 continues to be enabled, as indicated in the truth table shown in FIG. 4. The multiplex control signal on a multiplexer control line 29 toggles so that internal data bus 23 is connected to the input of output buffer 27. Output buffer 27 then drives the state of internal data bus 23 onto address/data bus 13 so that the data is delivered to multiplexed device 11.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A processor comprising:
   an internal address bus;
   an internal data bus; and,
   a selection means;
   wherein, the internal address bus is connected to an external address bus;
   wherein an external address/data bus is coupled to the processor;
   wherein the selection means is for electrically connecting the internal data bus to the external address/data bus during a first data transfer between the processor and a first external device which uses non-multiplexed data transactions, the selection means is for electrically connecting the internal address bus to the external address/data bus during an address phase of a second data transfer between the processor and a second external device which uses multiplexed data transactions, and the selection means is for electrically connecting the internal data bus to the external address/data bus during a data phase of the second data transfer between the processor and a second external device;
   wherein the selection means includes
      a multiplexer including:
         a first selection input connected to the internal data bus,
         a second selection input connected to the internal address bus, and
         a multiplexer control input;
      an output buffer, an input of the output buffer connected to an output of the multiplexer, and an output of the output buffer connected to the external address/data bus, the output buffer having an output buffer control input;
      an input buffer, an input of the input buffer being connected to the external address/data bus and an output of the input buffer being connected to the internal data bus, the input buffer having an input buffer control input;
   wherein one of the output buffer control input and the input buffer control input is inverted and the input buffer control input is connected to the output buffer control input; and,
   wherein:
      when the first data transaction is a write transaction, a first multiplexer value is placed on multiplexer control input and a first buffer control value is placed on the output buffer control input and on the input buffer control input,
      when the first data transaction is a read transaction, a second buffer control value is placed on the output buffer control input and on the input buffer control input,
      when the second data transaction is a write transaction, the first multiplexer value is placed on multiplexer control input and the first buffer control value is placed on the output buffer control input and on the input buffer control input during the data phase of the second data transaction,
      when the second data transaction is a read transaction, the second buffer control value is placed on the output buffer control input and on the input buffer control input during the data phase of the second data transaction, and
      during the address phase of the second data transaction, a second multiplexer value is placed on multiplexer control input and the first buffer control value is placed on the output buffer control input and on the input buffer control input.

2. A processor comprising:
   an internal address bus connected to an external address bus;
   an internal data bus;
   selection logic, connected to the internal data bus, the internal address bus and to an external address/data bus, the selection logic including:
      a selection control input, and
      a buffer control input; and,
   a bus controller, which controls the selection logic via the selection control input and the buffer control input, wherein:
      during a non-multiplexed write transaction, the bus controller places a first selection control value on the selection control input, and places a first buffer control value on the buffer control input, resulting in the selection logic forwarding values on the internal data bus to the external address/data bus,
      during a non-multiplexed read transaction, the bus controller places a second buffer control value on the buffer control input, resulting in the selection logic forwarding values on the external address/data bus to the internal data bus,
      during an address phase of a multiplexed write transaction, the bus controller places a second selection control value on the selection control input, and places the first buffer control value on the buffer control input, resulting in the selection logic forwarding values on the internal address bus to the external address/data bus,
      during a data phase of a multiplexed write transaction, the bus controller places the first selection control value on the selection control input, and places the first buffer control value on the buffer control input, resulting in the selection logic forwarding values on the internal data bus to the external address/data bus,
      during an address phase of a multiplexed read transaction, the bus controller places a second selection control value on the selection control input, and places the first buffer control value on the buffer control input, resulting in the selection logic forwarding values on the internal address bus to the external address/data bus, and during a data phase of a multiplexed read transaction, the bus controller places the second buffer control value on the buffer control input, resulting in the selection logic forwarding values on the external address/data bus to the internal data bus.

3. A processor as in claim 2 wherein the selection logic comprises:

a multiplexer having a first multiplexer input connected to the internal data bus, a second multiplexer input connected to the internal address bus, a multiplexer output, and a multiplexer control input connected to the selection control input;

a first buffer having an input connected to the multiplexer output, an output connected to the external address/data bus, and a buffer control input connected to the buffer control input; and a second buffer having an input connected to the internal address/data bus, an output connected to the internal data bus, and a buffer control input connected to the buffer control input.

4. A processor as in claim 2 wherein the bus controller includes an address region configuration map which indicates which memory regions are located within an external device which uses non-multiplexed data transactions, and which memory regions are located within and external device which uses non-multiplexed data transactions.

5. A processor as in claim 2 wherein the bus controller includes an address region configuration map which indicates which memory regions are located within an external device which uses non-multiplexed data transactions, and which memory regions are located within and external device which uses non-multiplexed data transactions.

6. A processor as in claim 5 wherein to generate the address region configuration map, the processor accesses a configuration device through a special bus to obtain configuration information.

7. A processor as in claim 2 wherein the processor receives, via control signals from a target device, information as to whether the target device supports either multiplexed or non-multiplexed data transfers.

8. A processor comprising:

an internal address bus connected to an external address bus;

an internal data bus;

selection logic, connected to the internal data bus, the internal address bus and to an external address/data bus; and, a bus controller, that generates control signals to control the selection logic so that:

during a non-multiplexed write transaction, the selection logic forwards values on the internal data bus to the external address/data bus, during a non-multiplexed read transaction, the selection logic forwards values on the external address/data bus to the internal data bus, during an address phase of a multiplexed write transaction, the selection logic forwards values on the internal address bus to the external address/data bus, during a data phase of a multiplexed write transaction, the selection logic forwards values on the internal data bus to the external address/data bus, during an address phase of a multiplexed read transaction, the selection logic forwards values on the internal address bus to the external address/data bus, and during a data phase of a multiplexed read transaction, the selection logic forwards values on the external address/data bus to the internal data bus.

9. A processor as in claim 8 wherein the bus controller includes an address region configuration map which indicates which memory regions are located within an external device which uses non-multiplexed data transactions, and which memory regions are located within and external device which uses non-multiplexed data transactions.

10. A processor as in claim 8 wherein the bus controller includes an address region configuration map which indicates which memory regions are located within an external device which uses non-multiplexed data transactions, and which memory regions are located within and external device which uses non-multiplexed data transactions.

11. A processor as in claim 10 wherein to generate the address region configuration map, the processor accesses a configuration device through a special bus to obtain configuration information.

12. A processor as in claim 8 wherein the processor receives, via control signals from a target device, information as to whether the target device supports either multiplexed or non-multiplexed data transfers.

* * * * *